US008090878B2

(12) United States Patent
Pallipuram et al.

(10) Patent No.: US 8,090,878 B2
(45) Date of Patent: *Jan. 3, 2012

(54) ONE-TO-MANY DEVICE SYNCHRONIZATION USING DOWNLOADED/SHARED CLIENT SOFTWARE

(75) Inventors: Gerard Pallipuram, Santa Clara, CA (US); Sudhir Kulkarni, Cupertino, CA (US)

(73) Assignee: Access Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/610,342

(22) Filed: Nov. 1, 2009

(65) Prior Publication Data
US 2010/0049759 A1 Feb. 25, 2010

Related U.S. Application Data

(63) Continuation of application No. 09/826,733, filed on Apr. 4, 2001, now Pat. No. 7,613,834.

(51) Int. Cl.
*G06F 17/30* (2006.01)
(52) U.S. Cl. ........ 709/248; 709/212; 709/213; 709/214; 707/610; 707/620
(58) Field of Classification Search .......... 709/212–214, 709/248; 707/610, 620
See application file for complete search history.

(56) References Cited

U.S. PATENT DOCUMENTS

| | | | | |
|---|---|---|---|---|
| 5,857,201 A * | 1/1999 | Wright et al. | ......................... | 1/1 |
| 5,926,816 A * | 7/1999 | Bauer et al. | ......................... | 1/1 |
| 5,974,238 A * | 10/1999 | Chase, Jr. | ..................... | 709/248 |
| 6,073,177 A * | 6/2000 | Hebel et al. | ................... | 709/228 |
| 6,199,762 B1 * | 3/2001 | Hohle | .......................... | 235/492 |
| 6,282,088 B1 * | 8/2001 | Canova et al. | .......... | 361/679.56 |
| 6,295,541 B1 * | 9/2001 | Bodnar et al. | ........................ | 1/1 |
| 6,308,201 B1 * | 10/2001 | Pivowar et al. | ............... | 709/214 |
| 6,321,236 B1 * | 11/2001 | Zollinger et al. | ..................... | 1/1 |
| 6,324,542 B1 * | 11/2001 | Wright et al. | ......................... | 1/1 |
| 6,324,544 B1 * | 11/2001 | Alam et al. | .......................... | 1/1 |
| 6,341,316 B1 * | 1/2002 | Kloba et al. | .................. | 709/248 |
| 6,389,423 B1 * | 5/2002 | Sakakura | ...................... | 707/613 |
| 6,393,434 B1 * | 5/2002 | Huang et al. | ......................... | 1/1 |
| 6,401,104 B1 * | 6/2002 | LaRue et al. | ......................... | 1/1 |
| 6,477,543 B1 * | 11/2002 | Huang et al. | ......................... | 1/1 |
| 6,539,381 B1 * | 3/2003 | Prasad et al. | ......................... | 1/1 |
| 6,553,375 B1 * | 4/2003 | Huang et al. | ......................... | 1/1 |
| 6,636,873 B1 * | 10/2003 | Carini et al. | ......................... | 1/1 |
| 6,654,785 B1 | 11/2003 | Craig | ........................... | 709/248 |
| 6,810,405 B1 * | 10/2004 | LaRue et al. | .................. | 707/613 |

(Continued)

*Primary Examiner* — Alina N. Boutah
(74) *Attorney, Agent, or Firm* — Berry & Associates, P.C.

(57) ABSTRACT

A method and system for performing one-to-many synchronization using a central server and also using downloadable client software. The system includes a central server, e.g., a web server or an enterprise server, that synchronizes with multiple electronic devices including, for example, a personal digital assistant, a laptop computer, a desktop computer, a cell phone, a pager, etc. Before the data synchronization takes place, and after the electronic device initiates communication with the server, the server downloads client software to the electronic device. The client software allows the electronic device to perform data synchronization with the server. After the synchronization is complete, the client software may be removed from the electronic device. The server data is located in one place and can be accessed from any location using almost any electronic device and the data can be readily protected. The invention provides geographically independent synchronization for the same device. The invention reduces the amount of metadata required to perform synchronization, eliminates slow synchronizations and also operates on standard or pre-existing data structures. The shared client software technique also reduces software maintenance and administrative issues and is helpful for application service providers (ASPS).

19 Claims, 13 Drawing Sheets

U.S. PATENT DOCUMENTS

| | | | |
|---|---|---|---|
| 6,816,910 B1 * | 11/2004 | Ricciulli | 709/237 |
| 6,874,037 B1 * | 3/2005 | Abram et al. | 709/248 |
| 6,990,533 B1 * | 1/2006 | Creemer | 709/248 |
| 6,999,469 B1 * | 2/2006 | Chu et al. | 370/466 |
| 7,013,316 B1 * | 3/2006 | Hansen et al. | 1/1 |
| 7,080,371 B1 * | 7/2006 | Arnaiz et al. | 717/170 |
| 7,142,196 B1 * | 11/2006 | Connor et al. | 345/173 |
| 7,143,194 B1 * | 11/2006 | Curley et al. | 709/248 |
| 7,181,525 B1 * | 2/2007 | Hebel et al. | 709/228 |
| 7,363,388 B2 * | 4/2008 | Huang et al. | 709/248 |
| 2002/0046286 A1 * | 4/2002 | Caldwell et al. | 709/229 |
| 2002/0063716 A1 * | 5/2002 | Osborn et al. | 345/533 |
| 2002/0087593 A1 * | 7/2002 | Rank | 707/503 |
| 2002/0105503 A1 * | 8/2002 | Oueslati et al. | 345/173 |
| 2002/0108091 A1 * | 8/2002 | Flanagin et al. | 714/798 |
| 2002/0116485 A1 * | 8/2002 | Black et al. | 709/223 |
| 2002/0161826 A1 * | 10/2002 | Arteaga et al. | 709/203 |
| 2003/0069874 A1 * | 4/2003 | Hertzog et al. | 707/1 |
| 2003/0105847 A1 * | 6/2003 | Jennery et al. | 709/223 |
| 2006/0277598 A1 * | 12/2006 | Ahn | 726/5 |

* cited by examiner

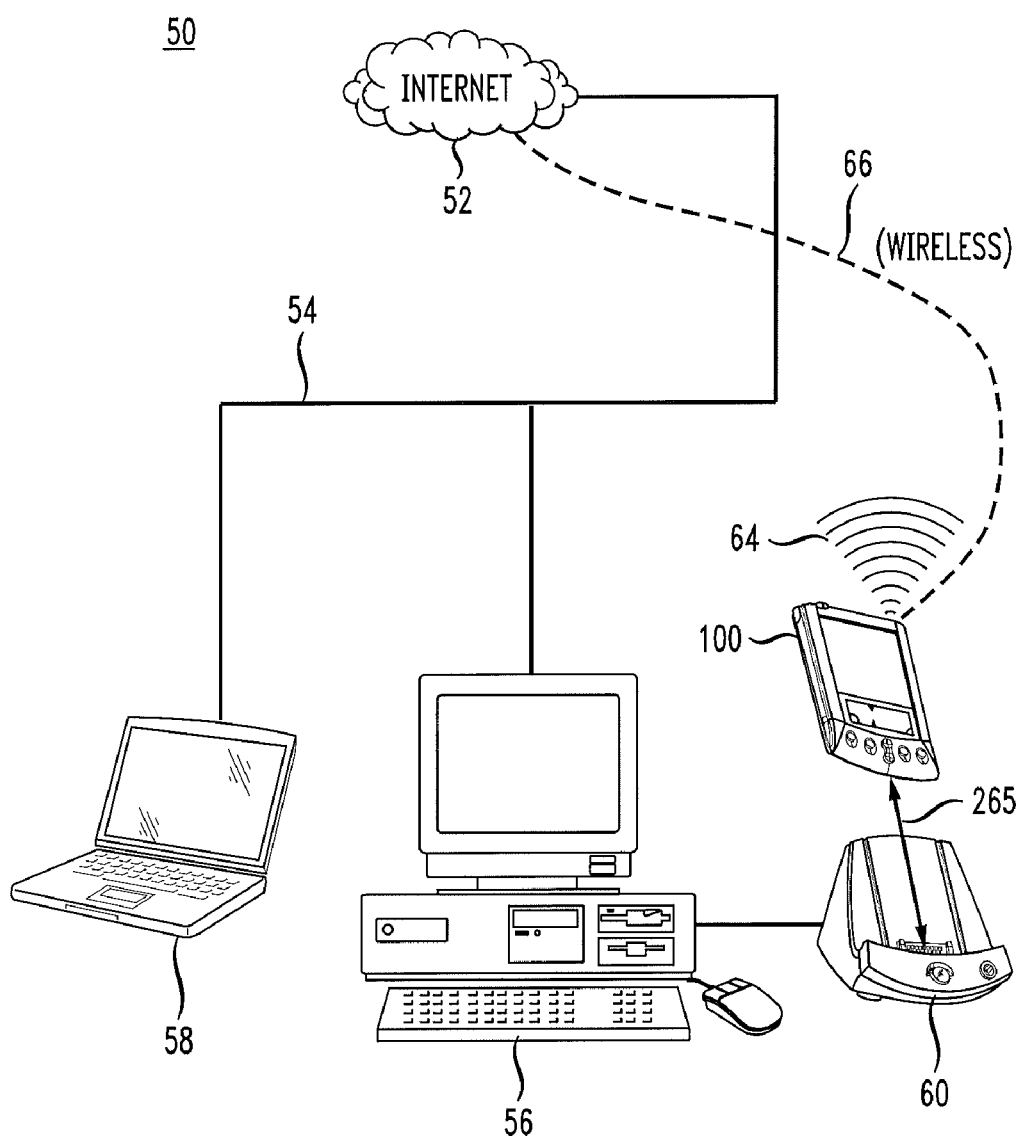

ONE-TO-MANY DEVICE SYNCHRONIZATION USING DOWNLOADED/SHARED CLIENT SOFTWARE

CROSS REFERENCE TO RELATED APPLICATIONS

This application is a continuation application of application Ser. No. 09/826,733, entitled "ONE-TO-MANY DEVICE SYNCHRONIZATION USING DOWNLOADED/ SHARED CLIENT SOFTWARE," filed Apr. 4, 2001, and assigned to the assignee of the present application. The subject matter in the above-identified co-pending and commonly owned application is incorporated herein by reference.

BACKGROUND OF THE INVENTION

1. Field of the Invention

The present invention relates to the field of data processing. More specifically, embodiments of the present invention relate to data synchronization and/or accessing systems utilizing a server and one or more electronic devices.

2. Related Art

As the components required to build a computer system have reduced in size, new categories of portable electronic devices and computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, datebook, etc.) and electronic notepads, to name a few. Palmtop computers with PIM software have been know as Personal Digital Assistants (PDAs). Many PDAs have a small and flat display screen associated therewith. Moreover, PDAs and cell phones are being integrated together resulting in a single intelligent device that provides wireless communication capability.

User convenience and device value are very important factors for portable electronic devices and systems that may include portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities. Similarly, the more useful the device, the more the device will be used and acquired.

The rapid penetration of portable electronic devices into the home and business markets has augmented, not replaced, the usefulness of desktop, laptop and server computer systems. As a result, it is not uncommon for a single user to have a portable electronic device and, in addition, also have one or more other computer systems. However, database information needs to be shared between these computer systems. Typically, what is desired is that any of the computer systems be able to make updates and revisions to the database.

FIG. 1A illustrates a three-way synchronization system 26 of the prior art allowing a database to be shared over three devices. System 26 includes a laptop or desktop computer 10, a portable computer system 12 and a web based server 14. Each of the three devices may contain a portion of a common database and each device may allow the user to edit records of its locally resident database copy. Synchronization processes 16, 18 and 20 synchronize the data between any two devices when they become connected together. Synchronization is the process of updating the records of the database from each device, and resolving conflicts, so that each device may have the most updated version of the database as is possible.

One problem with the three-way synchronization system 26 of FIG. 1A is that it often requires complex synchronization software to account for the various conflict resolution mechanisms that are required when any of the three devices may independently update records of the database. Moreover, the client software 22 must be present in each device in order to perform synchronization. By requiring each device to have its own client software, that means new devices that do not have the software are unable to participate in the synchronization. Further, this requirement also makes software revisions more difficult to perform because the client software is distributed on each device.

Another problem with the three-way synchronization system 26 of FIG. 1A is that it often requires complex metadata (including timestamps and revision flags) in order to keep track of the records and the way in which they were updated by the various devices and also the time that they were updated. Because complex metadata is required, standard database structures are not used in system 26. Three-way synchronization also can lead to "slow synchronizations." Slow synchronization results when a synchronization is performed between device A and device B that erases the revision flags of device A. Then, device A synchronizes with device C which leads to a slow synchronization because the revision flags of device A are gone. This happens frequently when a PDA is synchronized at work and then taken home and synchronized there also. Another problem with the three-way synchronization system 26 is that there is no central location of the database information since it is spread over the devices. This makes it difficult to 1) perform enterprise management tasks, 2) secure the data and 3) back up the data effectively.

FIG. 1B illustrates an n-way synchronization system 36 of the prior art for sharing a database. In this system, the clients 32a-32d each synchronize with a central server 30 but not with each other. Central server 30 resolves synchronization conflicts. Like the system of FIG. 1A, system 36 still requires that each client 32a-32d have its own client software 34 to perform the synchronization. As discussed above, by requiring each client to have its own software, that means new devices that do not have the client software are unable to participate in the synchronization. Further, this requirement also makes software revisions more difficult to perform because each client needs to be separately updated.

SUMMARY OF THE INVENTION

Accordingly, what is needed is a method and system that allows synchronization between computer systems but does not require each computer system to have its own client software in order to participate in the synchronization. What is further needed is a synchronization system that can be used with conventional data structures and that does not require a large overhead of metadata. What is needed yet is a synchronization system whereby devices can synchronize their database copies in a geographically independent way. What is also needed is a synchronization system that facilitates software revision management. What is also needed is a synchronization system that offers a central data store to facilitate enterprise management tasks, data security and data back-up. What is yet needed is a synchronization method that eliminates slow synchronizations. Embodiments of the present invention provide the above advantages and others not specifically mentioned above but described in the sections to follow.

A method and system are described herein for performing one-to-many synchronization using a central server and also using downloadable/shared client software. The system includes a central server, e.g., a web server or an enterprise server, that synchronizes with multiple electronic devices including, for example, a personal digital assistant, a laptop computer, a desktop computer, a cell phone, a pager, etc. Any electronic device can be used in conjunction with the present invention. Before the data synchronization takes place, and after the electronic device initiates communication with the server, the server downloads client software to the electronic device and this client software is therefore shared. The client software allows the electronic device to perform data synchronization in a manner that is compliant with the server.

After the synchronization is complete, the client software may be removed from the electronic device. If the acquired data is only temporarily needed, after the data is used by the electronic device, it can be removed or the data can be removed upon the next synchronization. The server data is located in one place and can be accessed via the Internet from any location using almost any electronic device. Further, the data on the server being centrally located provides better enterprise data management, can readily be protected and can readily be backed-up. The present invention provides geographically independent synchronization for the same device. The present invention also reduces the amount of metadata required to perform synchronization, eliminates slow synchronizations and also operates on standard or pre-existing data structures. The shared client software technique also reduces software maintenance and administrative issues and is helpful for application service providers (ASPS).

More specifically, an embodiment of the present invention includes a method of communicating in a communication system comprising a plurality of client devices and a server, the method comprising the step of: a) the server device maintaining a database and client software, the database comprising information and the client software comprising instructions for performing a synchronization compliant with the server; b) a first client device establishing a communication link with the server; c) the first client device receiving a copy of the client software from the server in response to the communication link being established; and d) the first client device using the client software to perform a synchronization with the server to obtain a portion of the information. The method further comprises the steps of: a second client device establishing a communication link with the server; the second client device receiving a copy of the client software from the server in response to the communication link being established for the second client device; and the second client device using the client software to perform a synchronization with the server to obtain a portion of the information. Embodiments also include a communication system implemented in accordance with the above.

BRIEF DESCRIPTION OF THE DRAWINGS

FIG. 2 is system illustration of a palmtop or "palm sized" computer system connected to other computer systems and the Internet.

DETAILED DESCRIPTION OF THE INVENTION

Figure 1A:
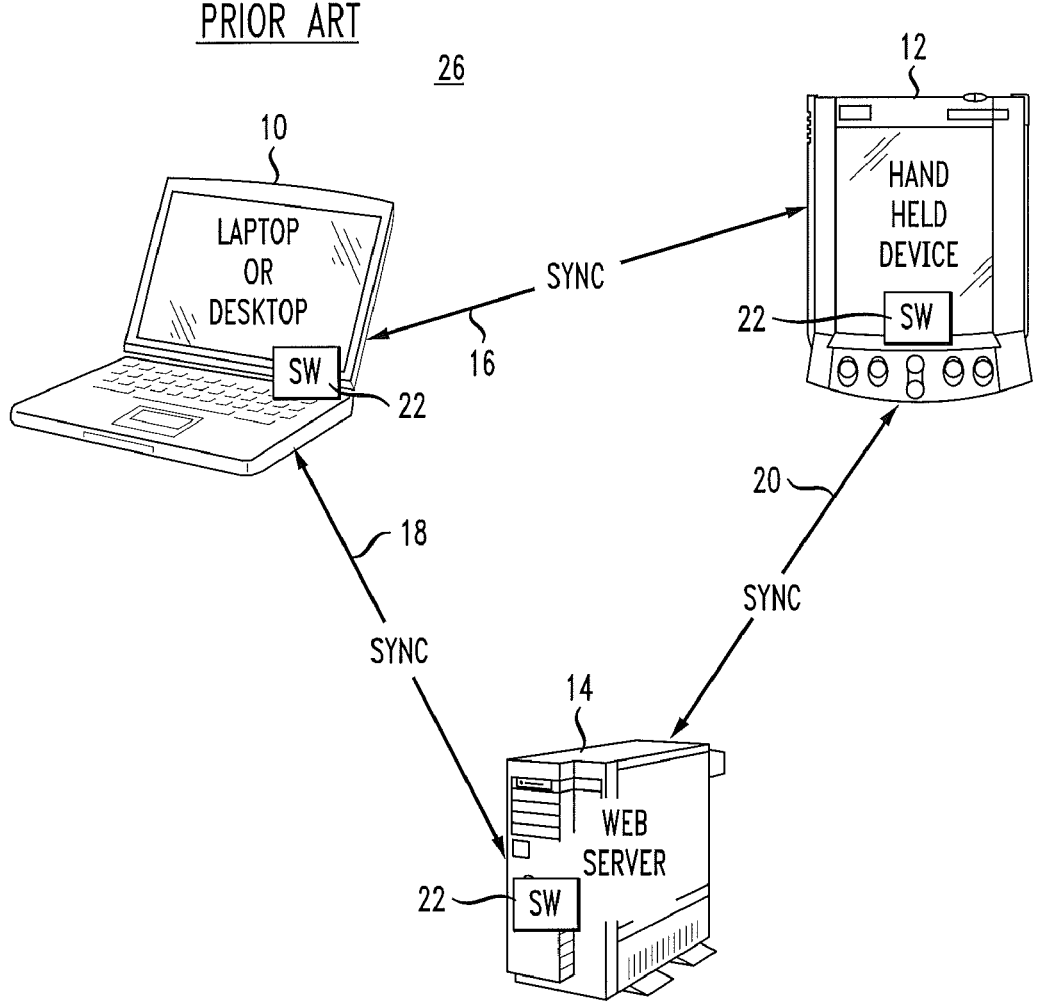
FIG. 1A is a three-way synchronization system in accordance with the prior art.
Figure 1B:
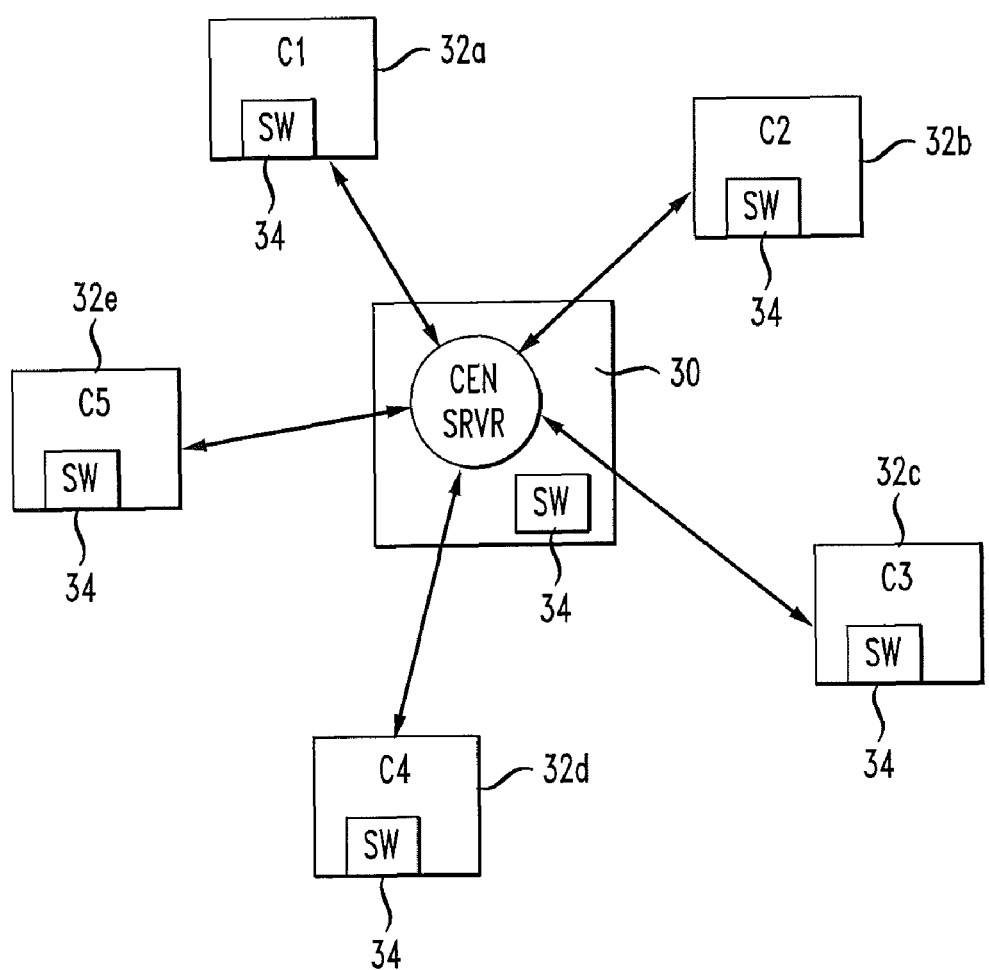
FIG. 1B is an n-way synchronization system in accordance with the prior art.

In the following detailed description of the present invention, a method and system for performing a one-to-many synchronization process using downloadable/shared client software, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow (e.g., processes 440, 500, 550 and 600) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "accessing" or "processing" or "computing" or "suspending" or "resuming" or "translating" or "calculating" or "determining" or "scrolling" or "displaying" or "recognizing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The processes of the present invention described herein are applicable to synchronization procedures between electronic devices which may include computer systems, portable computer systems, cell phones, pagers, etc. Some portable computer systems called personal digital assistants (PDAs) are hand-held. Although applicable across a wide variety of platforms and devices, an embodiment of the present invention is described herein by example with respect to a portable or mobile computer system, e.g., a PDA.

FIG. 2 illustrates an exemplary networked system 50 that can be used in conjunction with an embodiment of the present invention. System 50 is exemplary only and comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 (or a separate communication channel) can provide communication with the Internet 52 using a number of well known protocols.

Importantly, a communication link is also coupled to a cradle 60 (or cable dock) for receiving and initiating communication with an exemplary palmtop ("palm-sized") portable computer system 100 over line 265. Cradle 60 provides an electrical and mechanical communication interface between the computer system 100 for two way communications. In one embodiment, the communication link including cradle 60 and line 265 is a serial communication link or can be a USB link. Computer system 100 may also contain a wireless infrared communication mechanism 64 for sending and receiving information to or from other devices. As discussed more fully below, computer system 100 also contains one or more other wireless communication mechanisms, e.g., cellular phone, Bluetooth and/or wireless LAN (e.g., IEEE 802.11), for instance, all of which can be used to establish the communication link between the portable computer system 100 and the host computer system or with the Internet directly 66.

Figure 3A:
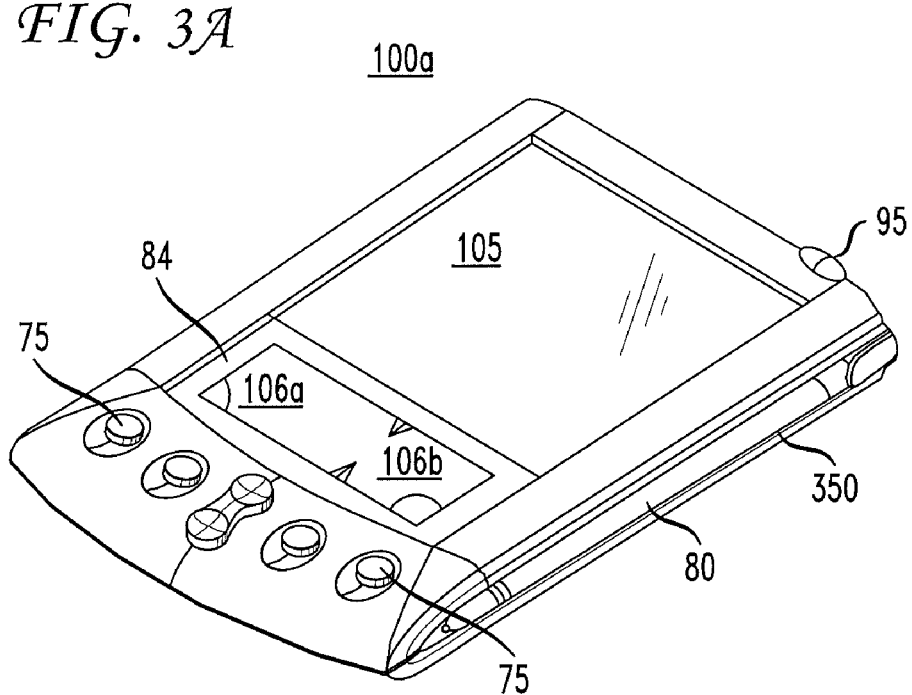
FIG. 3A is a top side perspective view of an exemplary palmtop computer system.

FIG. 3A is a perspective illustration of the top face 100a of one embodiment of the palmtop computer system. The top face 110a contains a display screen 105 surrounded by a bezel or cover. A removable stylus 80 is also shown. The display screen 105 contains a transparent touch screen (digitizer) able to register contact between the screen and the tip of the stylus 80. The stylus 80 can be of any material to make contact with the screen 105. As shown in FIG. 3A, the stylus 80 is inserted into a receiving slot or rail 350. Slot or rail 350 acts to hold the stylus when the computer system 100a is not in use. Slot or rail 350 may contain switching devices for automatically powering down and automatically power up computer system 100a based on the position of the stylus 80. The top face 100a also contains one or more dedicated and/or programmable buttons 75 for selecting information and causing the computer system to implement functions. Other buttons (icons) can be implemented within a silk screen layer material 84 on which regions 106a and 106b reside, An exemplary on/off button 95 is also shown.

FIG. 3A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 6:
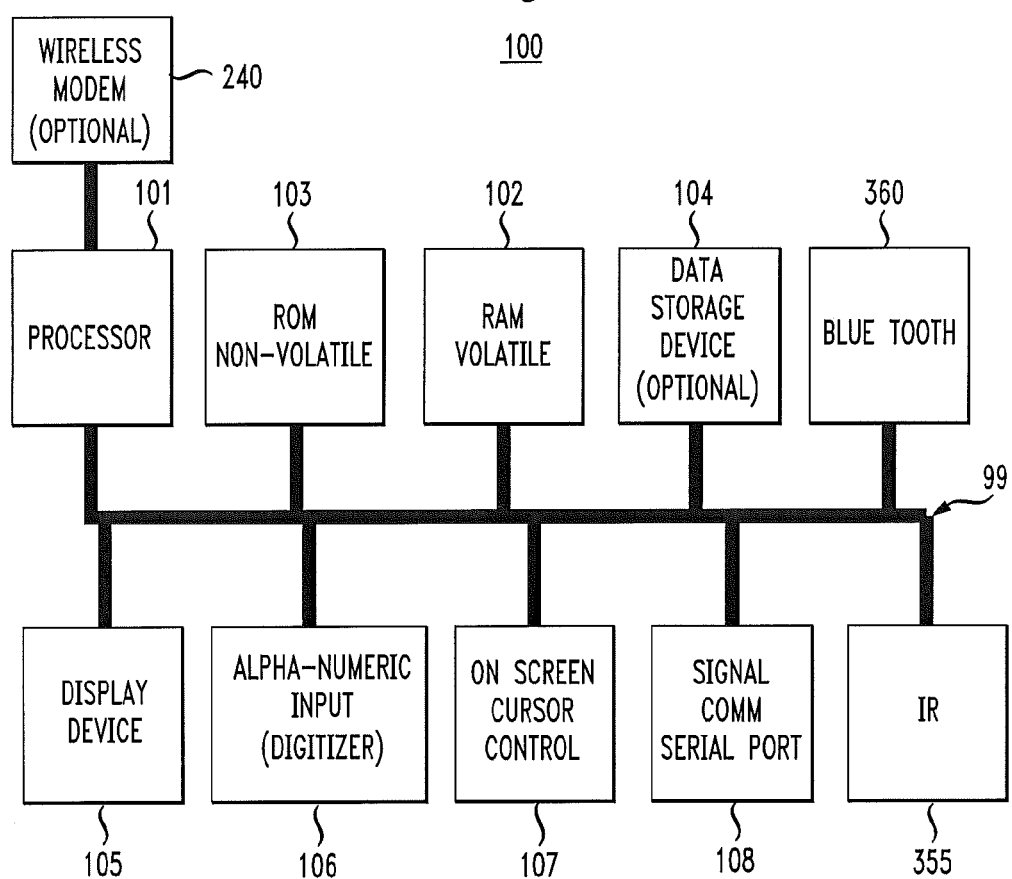
FIG. 6 is a logical block diagram of an exemplary palmtop computer system in accordance with an embodiment of the present invention.

The digitizer 106 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 6). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data are then stored in a memory by the processor 101 (FIG. 6) for later analysis.

Figure 3B:
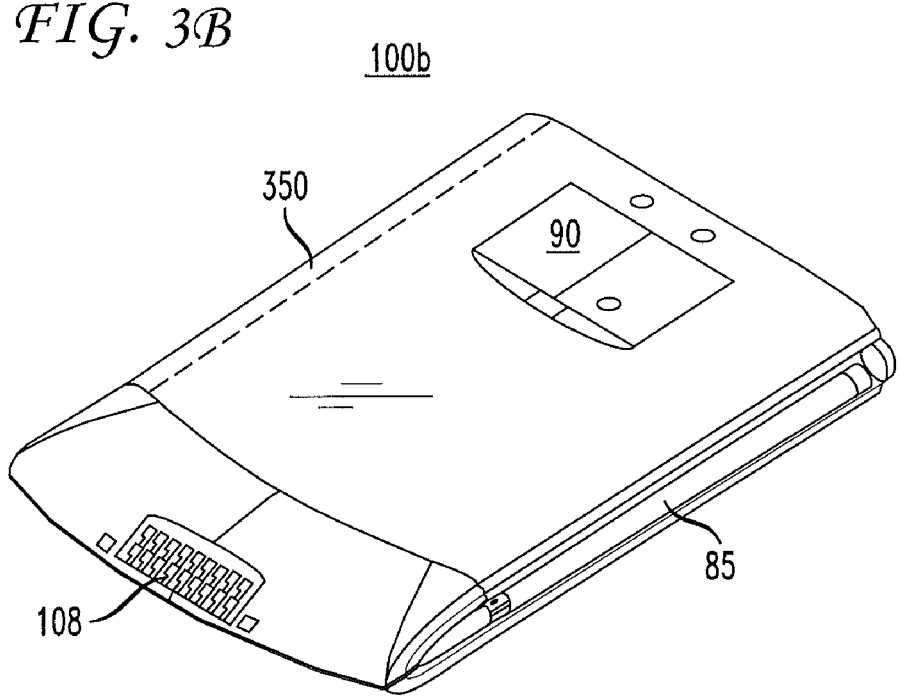
FIG. 3B is a bottom side perspective view of the exemplary palmtop computer system of FIG. 3A.

FIG. 3B illustrates the bottom side 100b of one embodiment of the palmtop computer system. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, SCSI, Firewire (IEEE 1394), Ethernet, etc. In FIG. 3B is also shown the stylus receiving slot or rail 350.

Figure 4:
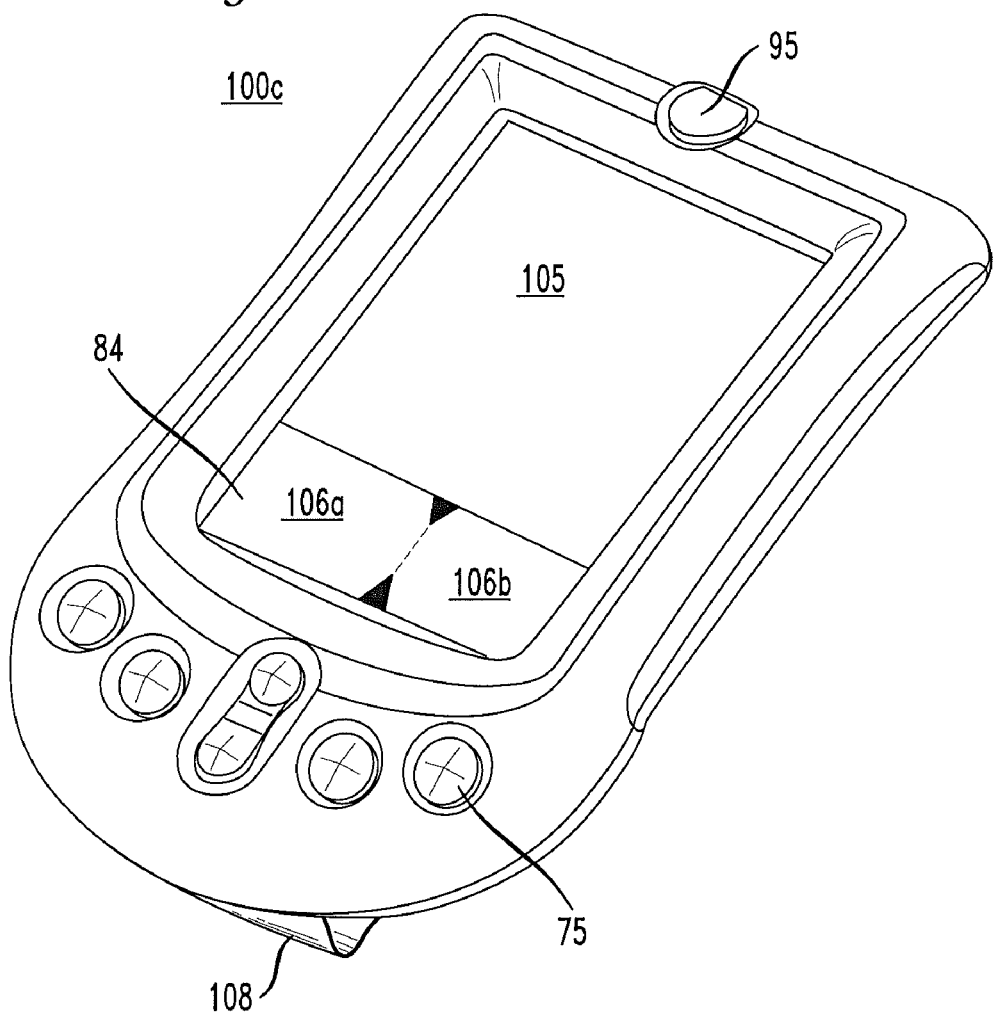
FIG. 4 is a perspective top view of another embodiment of the exemplary palmtop computer system.

FIG. 4 illustrates a front perspective view of another implementation 100c of the palmtop computer system. As shown, the flat central area is composed of a display screen area 105 and a thin silk screen layer material portion 84. Typically, the silk screen layer material portion 84 is opaque and may contain icons, buttons, images, etc., graphically printed thereon in addition to regions 106a and 106b. The display screen area 105 and portion 84 are disposed over a digitizer.

Figure 5:
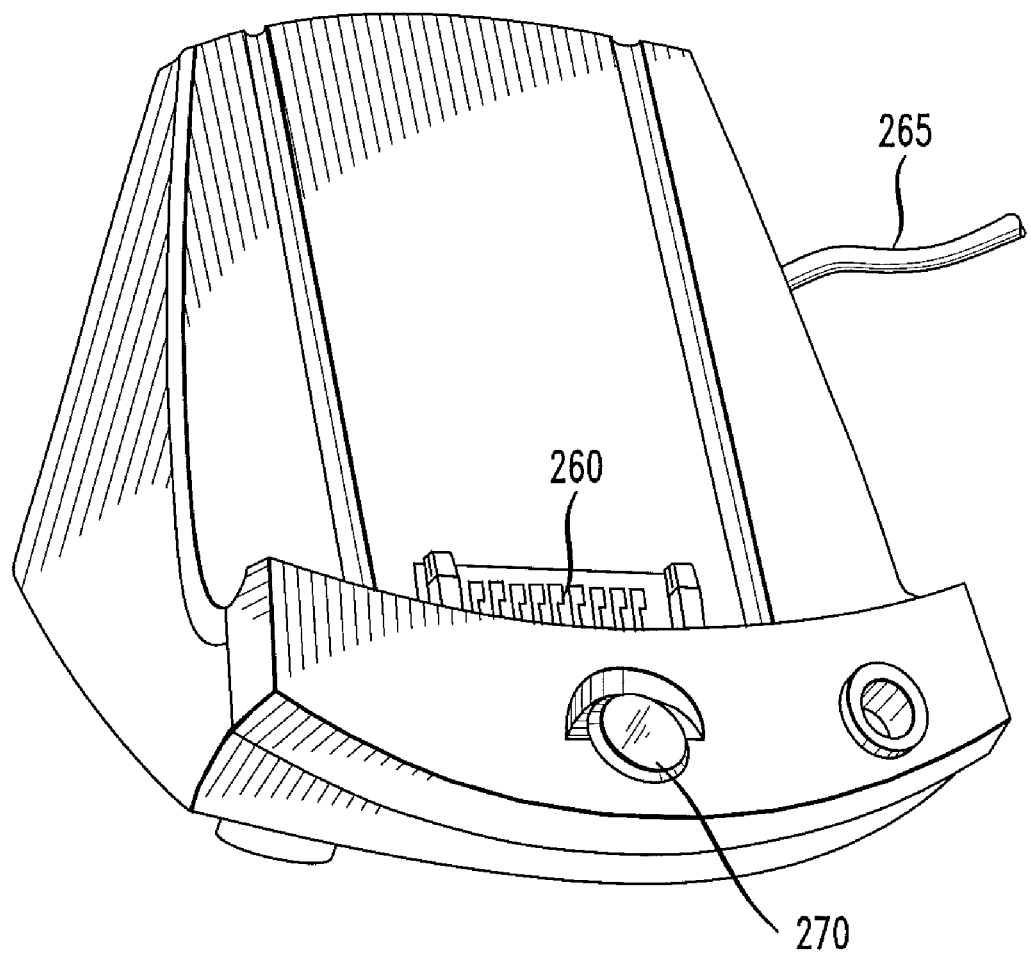
FIG. 5 is a perspective view of a cradle device for connecting a palmtop computer system to other systems via a communication interface.

FIG. 5 is a perspective illustration of one embodiment of the cradle 60 for receiving the palmtop computer system 100. In other embodiments, cradle 60 is not a stand-up device but is rather part of a cable connection between the palmtop computer system 100 and the desk top unit. Cradle 60 contains a mechanical and electrical interface 260 for interfacing with serial connection 108 (FIG. 3B) of computer system 100 when system 100 is slid into the cradle 60 in an upright position. Alternatively, a USB connection could be used. Once inserted, button 270 may be pressed to initiate two way communication between system 100 and other computer systems coupled to serial communication 265.

FIG. 6 illustrates exemplary circuitry of portable computer system 100. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., thin profile removable memory) coupled with the bus 99 for storing information and instructions. Device 104 can be removable.

Also included in computer system 100 of FIG. 6 is an alphanumeric input device 106 which in one implementation is a handwriting recognition pad ("digitizer") having regions 106a and 106b (FIG. 3A), for instance and buttons. Device 106 can communicate information (spatial data and pressure data) and command selections to the central processor 101.

System 100 also includes an optional cursor control or directing device 107 coupled to the bus for communicating user input information and command selections to the central processor 101. In one implementation, device 107 is a touch screen device (also a digitizer) incorporated with screen 105. Device 107 is capable of registering a position on the screen 105 where the stylus makes contact and the pressure of the contact. The digitizer can be implemented using well known devices, for instance, using the ADS-7846 device by Burr-Brown that provides separate channels for spatial stroke information and pressure information.

System 100 also contains a display device 105 coupled to the bus 99 for displaying information to the computer user. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. Any of a number of display technologies can be used, e.g., LCD, FED, plasma, etc., for the flat panel display 105. In one embodiment, the display 105 is a flat panel multi-mode display capable of both monochrome and color display modes.

Signal communication device 108, also coupled to bus 99, can be a serial port (or USB port) for communicating with the cradle 60. In addition to device 108, wireless communication links can be established between the device 100 and a host computer system (or another portable computer system) using a Bluetooth wireless device 360, an infrared device 355, or a GSM radio device 240. Device 100 may also include a wireless modem device 240 and/or a wireless radio, e.g., a GSM wireless radio with supporting chipset. The wireless modem device 240 is coupled to communicate with the processor 101 but may not be directly coupled to port 108.

In one implementation, the Mobitex wireless communication system may be used to provide two way communication between system 100 and other networked computers and/or the Internet via a proxy server. In other embodiments, TCP protocol can be used or SMS (Short Message Service) can be used. System 100 of FIG. 6 may also contain batteries for providing electrical power. Replaceable cells or rechargeable batteries can be used. Well known electronics may be coupled to the battery to detect its energy level and this information can be sampled by the processor 101.

Figure 7:
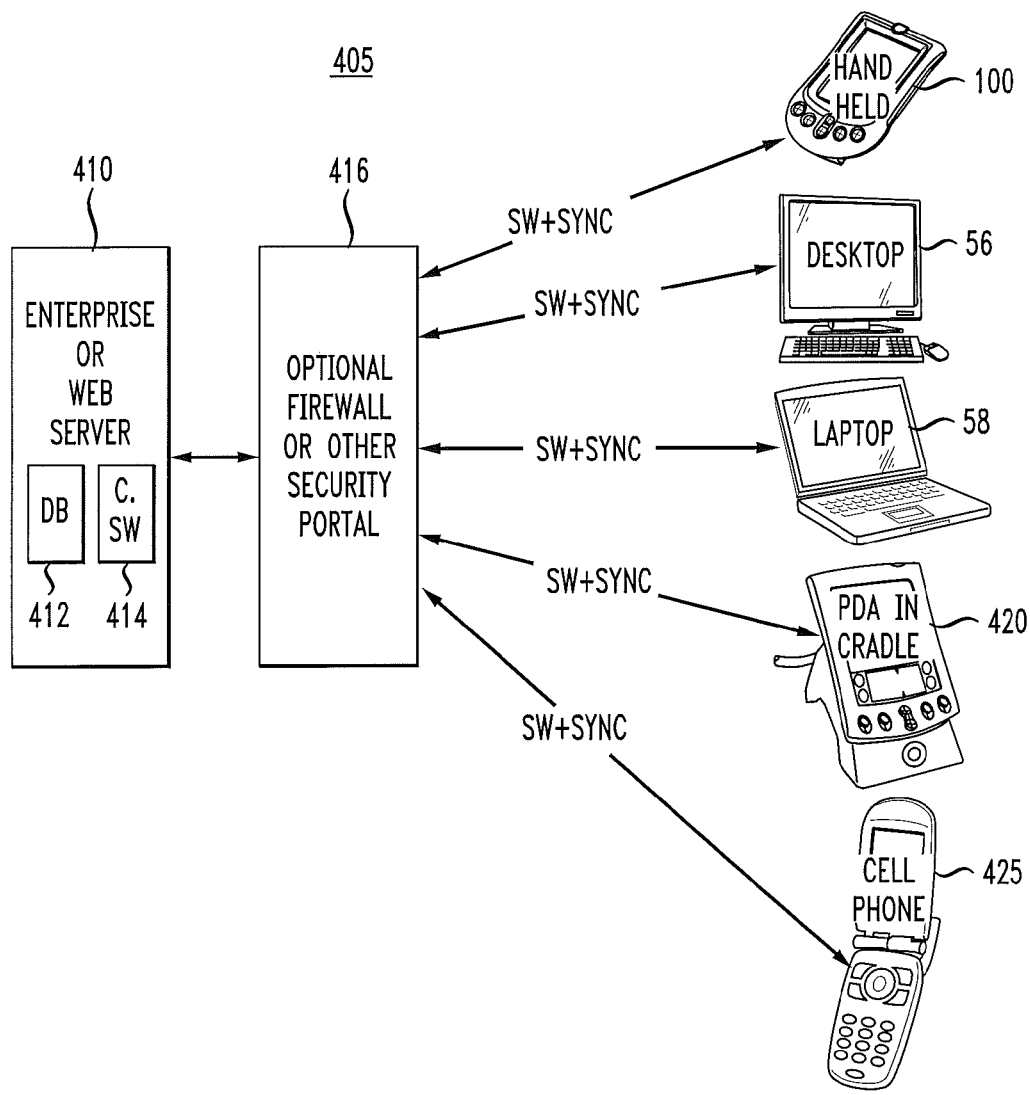
FIG. 7 illustrates a communication system in accordance with an embodiment of the present invention performing a one-to-many synchronization process using downloadable/shared client synchronization software.

One-to-Many Synchronization System of the Present Invention Using Shared Client Software FIG. 7 illustrates a communication and synchronization system 405 in accordance with an embodiment of the present invention. System 405 contains a central server 410 which maintains a database 412. Also included in the central server 410 is client software 414 that is used to perform server-compliant synchronization between a client and the server 410. The server 410 could be any server type, e.g., a web server that was accessible over the Internet, or could be an enterprise server. The clients synchronize with the same server 410 thereby creating a one-to-many scheme. The general process and results achieved through synchronization are described in more detail in the following: U.S. Pat. No. 5,727,202 issued Mar. 10, 1998 by Kucala; U.S. Pat. No. 6,000,000 issued Dec. 7, 1999 by Hawkins et al.; U.S. Pat. No. 5,832,489 issued Nov. 3, 1998 by Kucala; U.S. Pat. No. 5,884,232 issued Mar. 16, 1999 by Hawkins et al.; and U.S. Pat. No. 6,006,274 issued Dec. 21, 1999 by Hawkins et al., all of which are hereby incorporated herein by reference.

In system 405, any number of different electronic devices may be a client. Some examples include a hand-held PDA device 100, a desktop computer 56, a laptop computer 58, a PDA located in a cradle 420, or a cell phone 425. Any of these electronic devices can connect to the central server 410 using the Internet. If an enterprise server is used, then an intranet can be used to connect the electronic device to the server 410. In any case, an optional security portal or "firewall" 416 can be used to identify users and verify authorized users, etc.

Within system 405, electronic devices, e.g., "clients" can synchronize with the database 412 on the server 405 to update their records and to update the records located on the database 412. In one embodiment, a client can synchronize only a portion of the records of the database 412, thereby performing only a partial synchronization. In a partial synchronization, the client device locally maintains only a portion of the information stored in database 412 and also database 412 is updated based on revisions from the client. Also, synchronization may take the form of a query command where a client asks the server 410 for only a specific amount or degree of information as defined by the query command. Central server 410 resolves synchronization conflicts between the data stores. In the one-to-many scheme 405, generally, the clients do not synchronize with each other directly.

By providing a central storage location for the database 412, the present invention facilitates enterprise management functions and also facilitates database security and data backup. Also, by enforcing a server based synchronization scheme, the synchronization software required of system 405 is greatly reduced in complexity in part because clients do not directly synchronize with each other. Eliminated is the need for large amounts of complex metadata (e.g., timestamps and revision flags) that is required in every client that allows client to client synchronization. Specifically, the large metadata is eliminated in both the desktop and the handheld platforms. The desktop may use some metadata to handle "n" different clients and the metadata is maintained by the central server. As a result, conventional data structures can be used in database 412 in accordance with embodiments of the present invention. Further, since clients do not synchronize with each other directly, and rather they synchronize with the same server 410, slow synchronization processes are eliminated. This is the case because revision flags (which are used for fast synchronization) are never reset until after the synchronization with the server 410 is done.

Moreover, by making the central server 410 located on the Internet, any device can perform synchronization from any location accessible via the Internet. In the past, perhaps the PDA could only be updated based on the user's location in proximity with the desktop. The present invention provides that the PDA 100 can be synchronized with the database 412 from virtually any geographic location. Synchronization is therefore location independent for any client device.

As shown by the communication pathways, the server 410 of FIG. 7 advantageously downloads client software 414 to each client before commencing a synchronization process, but after a communication link has been initiated by the client. The client software 414 is used by the client in order to perform synchronization with the server 410 and defines the type of synchronization to be done including any synchronization rules that are server compliant. The client software 414 can also include software for viewing the data by the client once downloaded.

By downloading the client software 414 on each synchronization, any client device can perform the synchronization processes (as defined by the client software) provided the user has the proper authorization from optional security portal 416; however, the client device does not need to have had the client software installed on it beforehand. In other words, the client need not have the required client software installed a priori in order to perform a synchronization because the needed software will be delivered to it by the sewer 410 at the time of synchronization. By downloading the required software on each synchronization, the server 410 in effect "shares" its client software 414 with the clients and greatly expands the number of devices that can operate as a client device within system 405.

This type of software sharing also greatly facilitates software revision management because new versions of client software 414 need only be installed on the server 410 and then will automatically propagate, as needed, to the clients. After it is used, the client can then discard the client software from its memory. This is advantageous also because client devices, that may be memory strapped, do not need to keep the client software in memory at all times, but can free up that memory when not performing synchronization.

Figure 8:
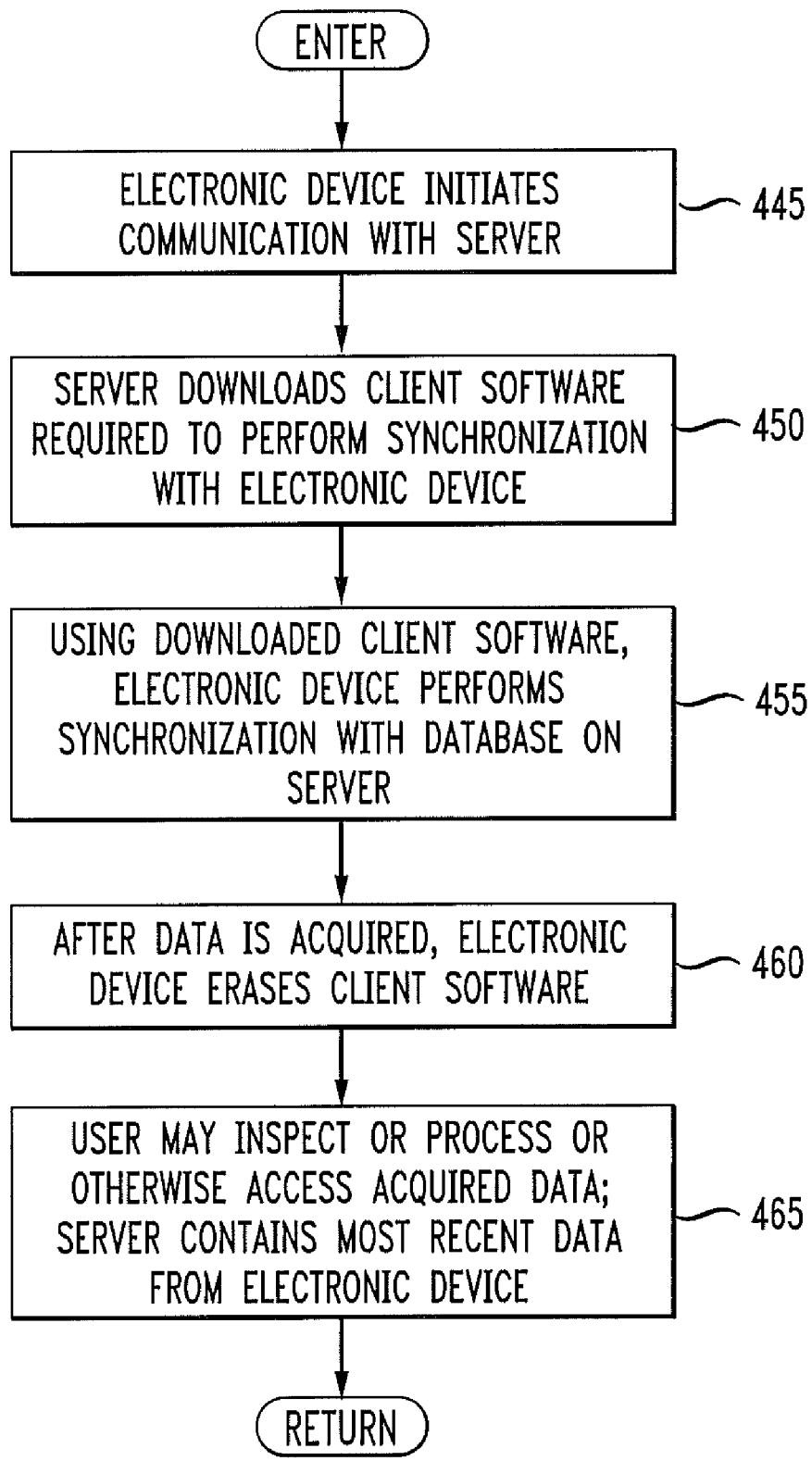
FIG. 8 is a generalized flow diagram of one embodiment of the present invention of an electronic device performing synchronization with a central server.

FIG. 8 illustrates a generalized process 440 in accordance with the synchronization methods of the present invention using a one-to-many synchronization scheme and shared client software. Process 440 is performed with respect to one electronic device, but it is appreciated that each other client device could also perform process 440 as well. At step 445, an electronic device, e.g., client, initiates a communication link with the server 410. Generally, step 445 occurs using the Internet, or an intranet, and may use wireless or wired links and/or both. At step 445, one or more user authentication steps may optionally be required to properly identify or authenticate the user before any communication link is established. At step 450, in response to a proper communication link being opened, the server 410 then downloads client software 414 to the electronic device provided the device does not already have the latest version of the software. It is appreciated that the viewing capabilities of the electronic device are largely transparent to the server 410. In one embodiment, the client software can also include viewing software so that the client can access the data obtained as a result of the synchronization. As discussed above, the client software 414 contains the required instructions, data, protocol, format and rules required by the client in order to perform synchronization with the server 410.

At step 455, using the downloaded/shared client software, the electronic device engages in a full or partial synchronization with database 412. Any of a number of well known synchronization techniques can be used. The type of synchronization performed is defined in the shared client software. During synchronization, revised records from the electronic device are synched to the server and vice-versa. The server 410 resolves any revision conflicts, e.g., where the same record has multiple revisions. At step 460, after the synchronization is complete, the electronic device disconnects from the server 410 and may optionally erase or otherwise deallocate the memory that stored the client software thereby freeing the memory for other uses.

At step 465, the user of the electronic device may inspect one or more records from the internal database or otherwise access any data acquired from the server 410. After process 440, the server 410 contains the most recent data from the electronic device. It is appreciated that at step 445, the electronic device need not have had any client software installed thereon for performing synchronization with server 410.

Figure 9:
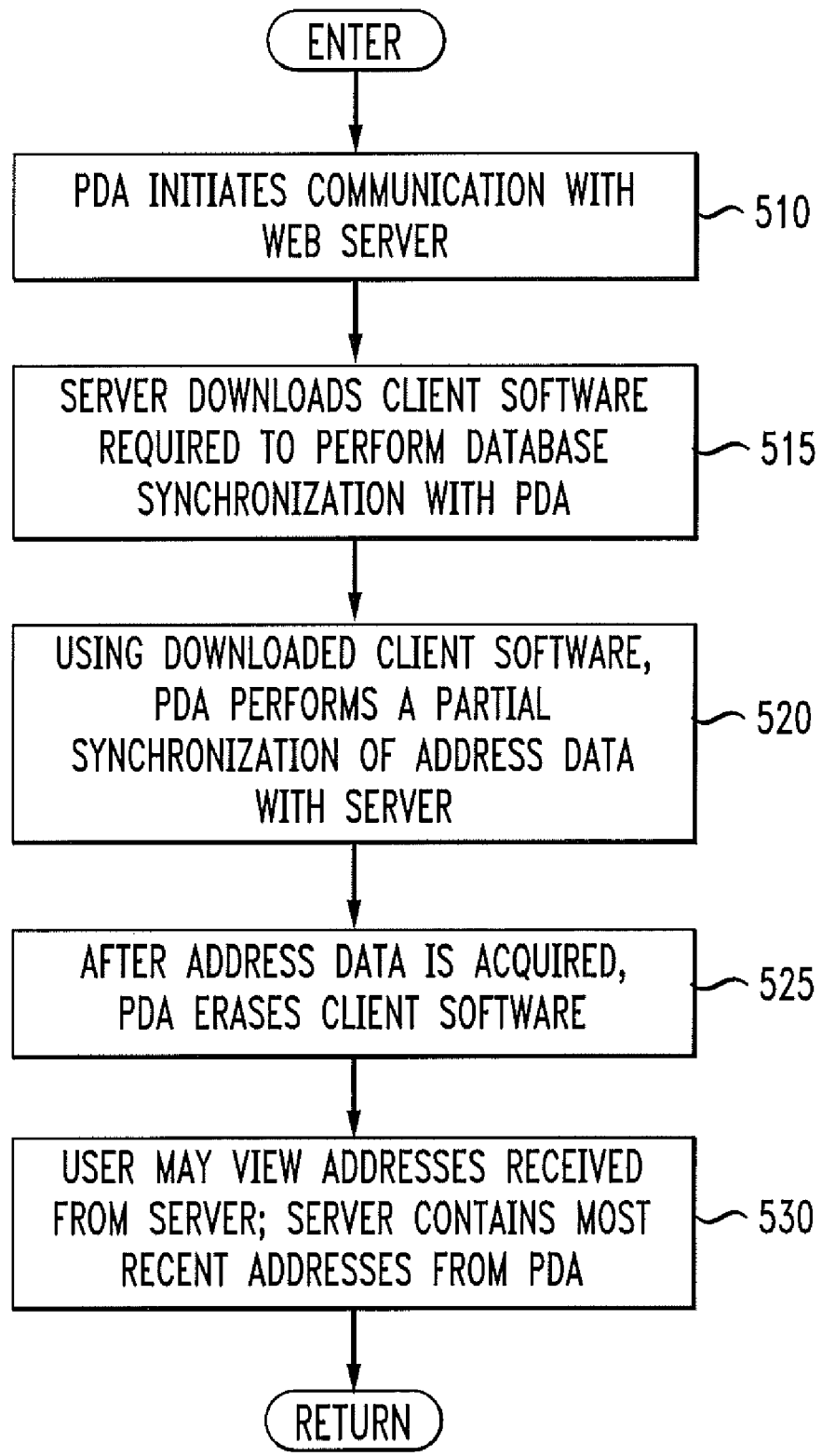
FIG. 9 is an exemplary flow diagram of one embodiment of the present invention of a personal digital assistant performing synchronization with a central server to obtain address data.

FIG. 9 illustrates an exemplary process 500 in accordance with the synchronization methods of the present invention using a one-to-many synchronization scheme and shared client software. In the example of FIG. 9, a PDA is used to communicate with a web-based server. At step 510, a PDA is used to establish a communication link with the web server. The PDA can couple to the web server via a cradle which is connected to a desktop which is connected to the Internet. Alternatively, the PDA can use a modem to connect directly to the Internet using a wired or a wireless connection (using an Internet browser). User identification and/or authentication may be performed at step 510. It is assumed that the PDA may not contain any synchronization software for the web server at step 510. It is also assumed that the web server maintains a database of address records, e.g., for a company or organization.

At step 515, the server downloads client software to the PDA upon a communication link being established. As discussed above, the client software describes the type of synchronization that is compliant with the web server. At step 520, using the downloaded/shared client software, the PDA performs a partial synchronization with the address database located on the web server. For instance, the PDA only synchronizes with the address records of one particular facility of the organization.

At step 525, after the synchronization, the PDA removes the client software from memory or otherwise deallocates the memory space for other uses. At step 530, the user of the PDA may access and/or view the records obtained from the web server. Also, after process 500, the web server has updated records from the PDA, if any.

Figure 10:
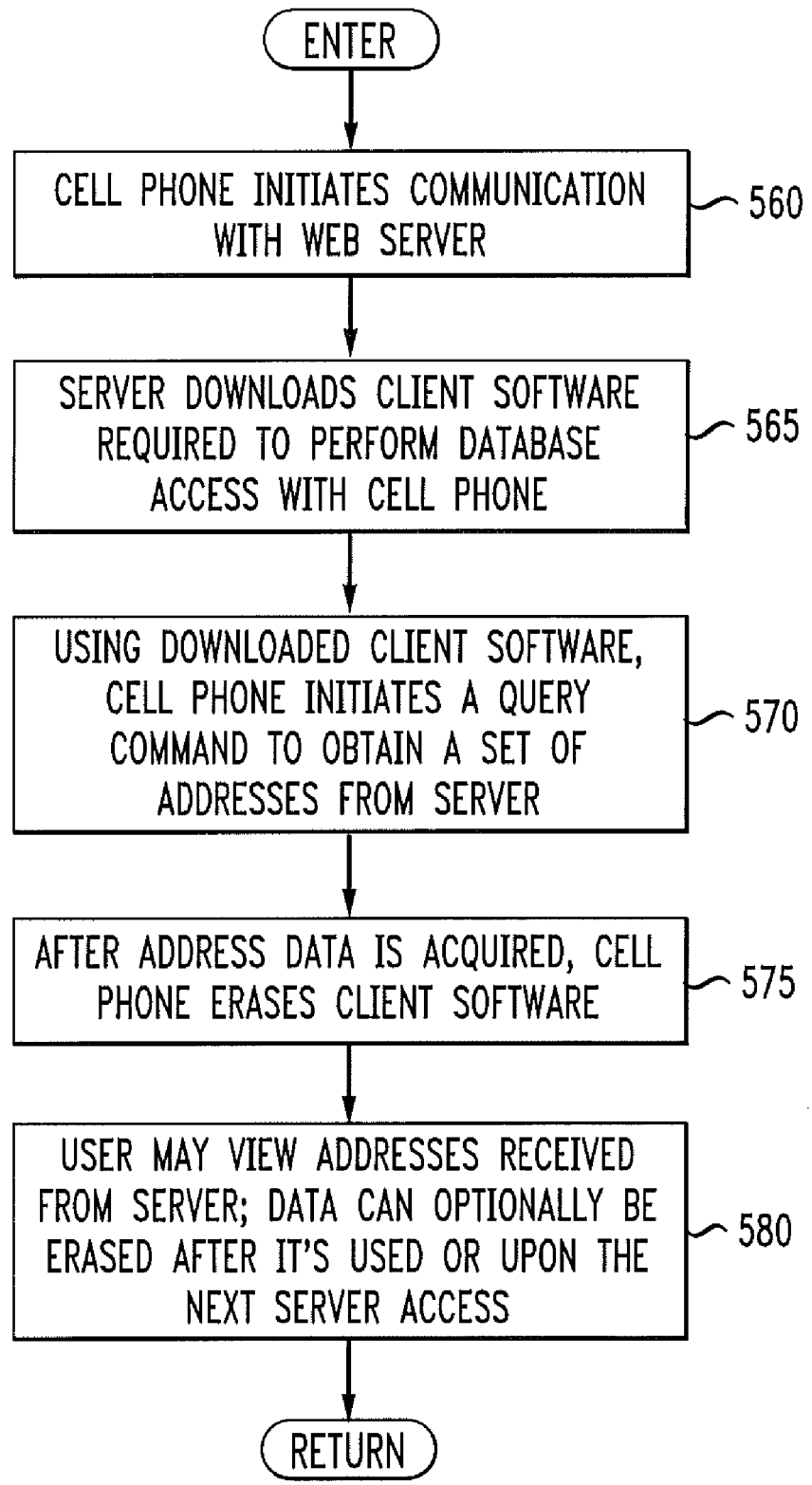
FIG. 10 is an exemplary flow diagram of one embodiment of the present invention of a cell phone device performing a query/synchronization with a central server to obtain temporarily needed address data.

FIG. 10 illustrates an exemplary process 550 in accordance with the synchronization methods of the present invention using a one-to-many synchronization scheme and shared client software. In the example of FIG. 10, a cell phone is used to communicate with a web-based server. It is assumed that the web server maintains a database of address records, e.g., for a company or organization. It is assumed that at step 560 the cell phone may not contain any synchronization software for the web server. It is also assumed that the cell phone is being borrowed to perform this task and therefore the database record data obtained by the web server is only temporarily needed by the cell phone device.

At step 560, the cell phone is used to establish a communication link with the web server. The cell phone can couple to the web server via a wired or a wireless connection and an Internet browser. User identification and/or authentication may be performed at step 560.

At step 565, the server downloads client software to the cell phone upon a communication link being established. As discussed above, the client software describes the type of synchronization that is compliant with the web server. At step 570, using the downloaded/shared client software, the cell phone performs a partial synchronization with the address database located on the web server. Alternatively, a query command can be given to the server, for instance, such that only a single record or group of records are obtained by the cell phone from the server.

At step 575, after the synchronization, the cell phone removes the client software from memory or otherwise deallocates the memory space for other uses. At step 580, the user of the cell phone may access and/or view the records obtained from the web server. Also, at step 580 the actual record data downloaded from the server can be erased from the cell phone after it has been viewed ("erase after one use") or upon any next synchronization ("erase upon next synchronization"). In this example, it is assumed that no record data was uploaded from the cell phone to the server.

Figure 11:
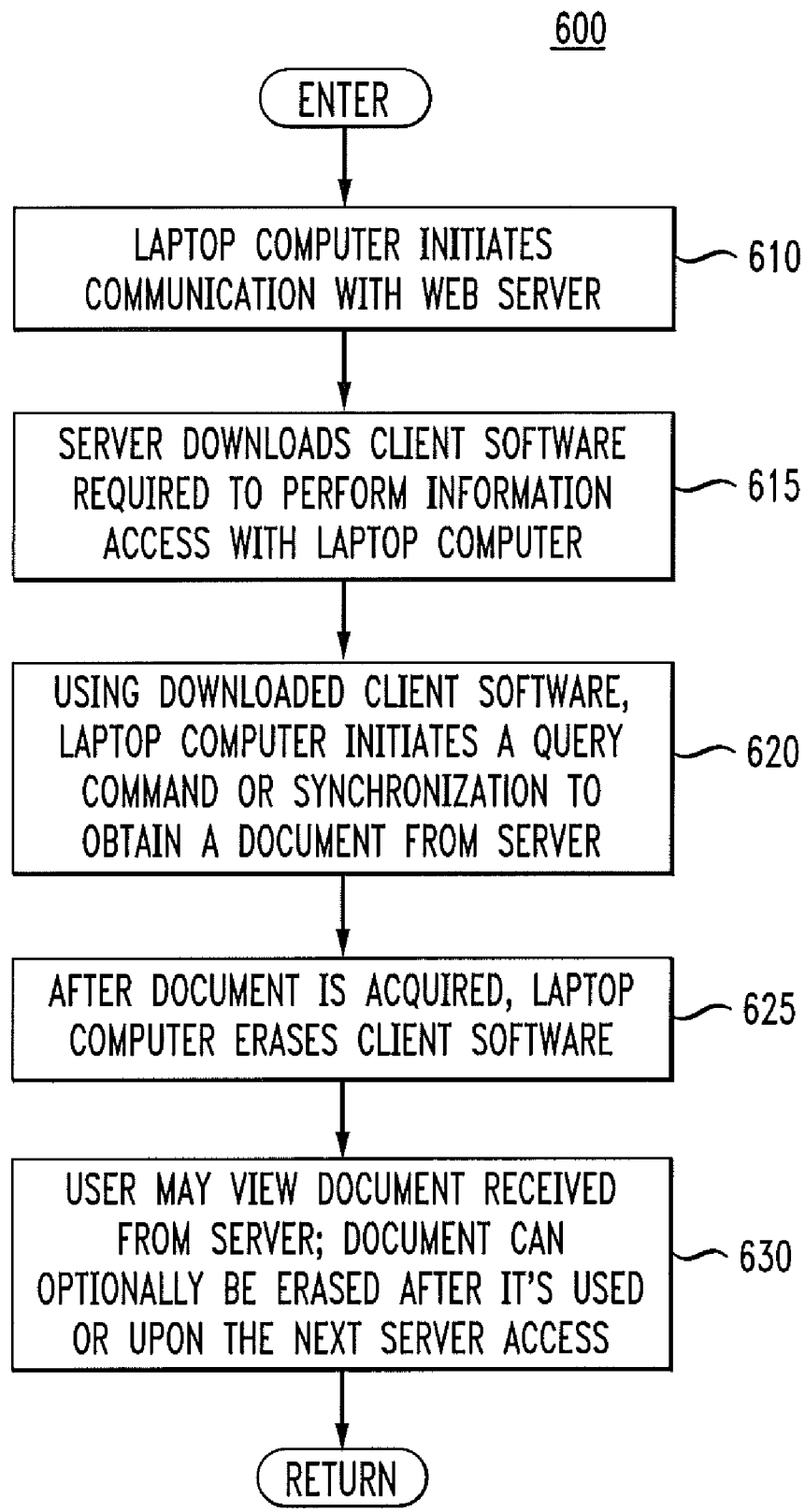
FIG. 11 is an exemplary flow diagram of one embodiment of the present invention of a laptop device performing a query/synchronization with a central server to obtain a document.

FIG. 11 illustrates an exemplary process 600 in accordance with the synchronization methods of the present invention using a one-to-many synchronization scheme and shared client software. In the example of FIG. 11, a laptop computer system ("laptop") is used to communicate with a web-based server. An Internet browser can be used to perform this task. It is assumed that the web server maintains a database of computer files and/or documents, e.g., business information for a company or organization. It is assumed that at step 610 the laptop may not contain any synchronization software for the web server. It is also assumed that the laptop is being borrowed to perform this task and therefore the information obtained from the server is only temporarily needed by the laptop device.

At step 610, the laptop is used to establish a communication link with the web server. The laptop can couple to the web server via a wired or a wireless connection. User identification and/or authentication may be performed at step 610.

At step 615, the server downloads client software to the laptop upon a communication link being established. As discussed above, the client software describes the type of synchronization that is compliant with the web server. At step 620, using the downloaded/shared client software, the laptop performs a partial synchronization with the documents located on the web server. A query command can be given to the server, for instance, such that only a single document or group of documents are obtained by the laptop from the server.

At step 625, after the synchronization and the document is obtained, the laptop removes the client software from memory or otherwise deallocates the memory space for other uses. At step 630, the user of the laptop may access and/or view the documents obtained from the web server. Also, at step 630 the actual information downloaded from the server can be erased from the laptop after it has been viewed ("erase after one use") or upon any next synchronization ("erase upon next synchronization"). In this example, it is assumed that no record data was uploaded from the laptop to the server.

It is appreciated that the embodiments of the present invention provide a synchronization process to provide electronic devices with web access to a central server without needing any specialized synchronization software installed therein a priori. By providing web accessed data, synchronization is location independent for a device. It is further appreciated that with respect to any of the examples given above, databases of conventional data structures can be used because the synchronization processes of the present invention do not require specialized or complex metadata.

Moreover, the use of a central data store or server facilitates an IS department's effort required to backup/restore the database records which are located in one file rather than dispersed over many different devices. Also, by having a central program store, the user does not have to ensure that the access point to the web has a viewer for the data. The access point only needs to be able to download the appropriate viewer/program from the central store. For instance, a computer at a public library may not have a viewer for the user's data. However, it does have an Internet connection and the user can download her program from the central store. The program then connects to the central data store and allows the user to view her data.

The shared program store also provides all the benefits of an ASP (application specific program) model. For instance, corporations can host the required applications and provide data storage for users. This reduces the administrative overhead for corporations and individual users. A central program store reduces overall disk-space requirements. Multiple users can access the same program store as opposed to having the program installed on multiple different computers. Also, the present invention alleviates software maintenance issues because software upgrades are automatically applied to all users of the system by merely updating the server software.

Figure 12:
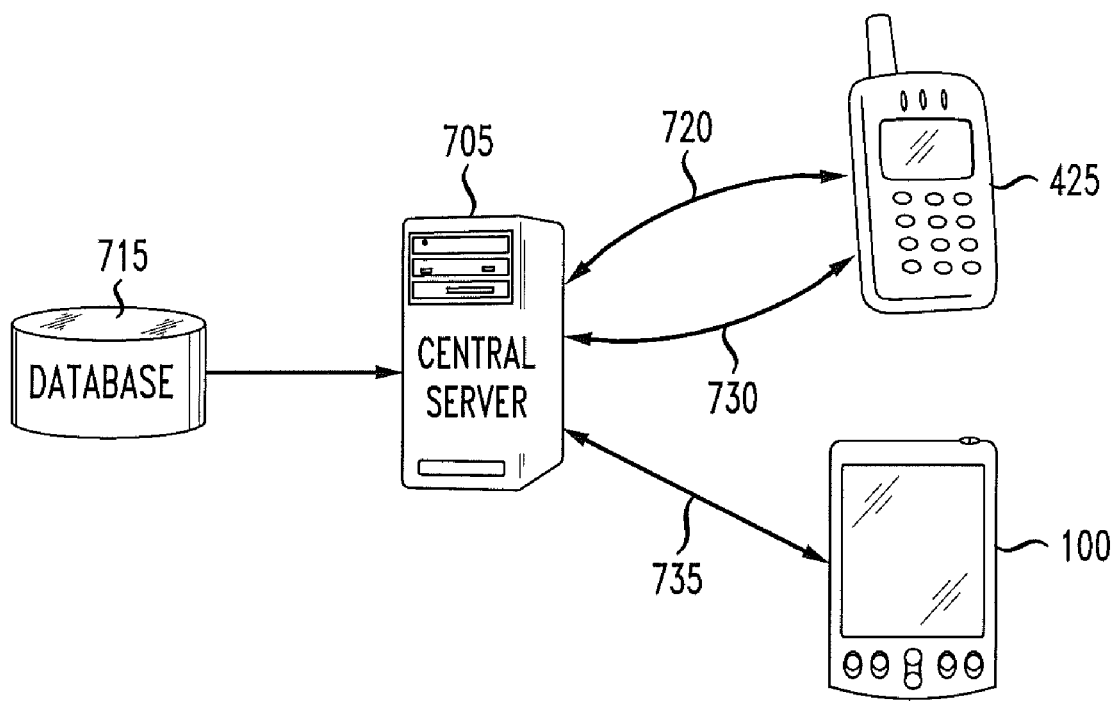
FIG. 12 is an exemplary system in accordance with an embodiment of the present invention.

FIG. 12 illustrates an exemplary system having a database 715, a central server 705 and a wireless phone 425 and a portable computer system 100. This system is used to illustrate an exemplary sequence of synchronizations. In the first synchronization, 720, the cell phone 425 performs a synchronization with the central server 705 regarding a contact list with phone numbers. A second synchronization 735 is performed by the PDA 100 and the server 705 where the PDA modifies certain phone numbers of the contact list. Then, a third synchronization 730 occurs between the cell phone 425 and the server 705 where the server updates the cell phone with changes made by the PDA. All synchronizations in this example are fast synchronizations.

The preferred embodiment of the present invention, a method and system for performing a one-to-many synchronization process using downloadable/shared client software, is thus described. While the present invention has been described in particular embodiments, it should be appreciated that the present invention should not be construed as limited by such embodiments, but rather construed according to the below claims.

What is claimed is:

1. A communication system comprising:
   a first electronic device comprising a database, server software and client synchronization software, the database comprising information and the client synchronization software comprising instructions for performing a data synchronization with the database compliant with said server software; and
   a second electronic device comprising a processor wherein the second electronic device establishes a communication link with the server software and downloads a copy of the client synchronization software from said first electronic device, wherein the processor executes the client synchronization software to perform the data synchronization and wherein said first electronic device erases the client synchronization software after the data synchronization is performed.

2. A communication system as described in claim 1 wherein the first electronic device erases a portion of the information on the first client device.

3. A communication system as described in claim 1 wherein the second electronic device provides a query command to the first electronic device.

4. A communication system as described in claim 1 wherein the data synchronization is a partial synchronization.

5. A communication system as described in claim 1 wherein the first electronic device is a web-based device and the second electronic device has telephony capability.

6. A communication system as described in claim 1 wherein the first electronic device authenticates the second electronic device prior to downloading the client synchronization device to the second electronic device.

7. A communication system as described in claim 1 wherein the second electronic device performs a plurality of data synchronizations before the client synchronization software is erased from the second electronic device.

8. A communication system as described in claim 1 wherein the connection established is established over the Internet.

9. A communication system as described in claim 1 wherein the client synchronization software defines the type of synchronization to be performed.

10. A method for performing a data synchronization between a first and second electronic device comprising:
   using a processor on a second electronic device to:
   establish a communication link between a second electronic device and a first electronic device;
   download a copy of client synchronization software from the first electronic device to the second electronic device; and
   synchronize data in a first database on the first electronic device with data in a second database on the second electronic device using the copy of the client synchronization software at the second device to perform the data synchronization; and
   remove the copy of the client synchronization software from the second electronic device after the data synchronization.

11. The method of claim 10, wherein synchronization step further comprises:
   providing a query command to the first electronic device.

12. The method of claim 11, wherein the query command is to request a document from the first electronic device.

13. The method of claim 10, wherein the synchronization performed is a partial synchronization.

14. The method of claim 10, wherein the first electronic device is a web-based device and the second electronic device has telephony capability.

15. The method of claim 10, further comprising authenticating the second electronic device.

16. The method of claim 10, wherein a plurality of synchronizations are performed before removal of the copy of the client synchronization software.

17. The method of claim 10, wherein the communication link is established over the Internet.

18. The method of claim 10, wherein the client synchronization software defines the type of synchronization to be performed.

19. A computer memory having recorded thereon a plurality of instructions for a processor comprising:
   instructions for establishing a communication link between a second electronic device and a first electronic device;
   instructions for downloading a copy of client synchronization software from the first electronic device to the second electronic device; and
   instructions for synchronizing data in a first database on the first electronic device with data in a second database on the second electronic device using the copy of the client synchronization software at the second device to perform the data synchronization; and
   instructions for removing the copy of the client synchronization software from the second electronic device after the data synchronization.

* * * * *